(12) United States Patent
Kim

(10) Patent No.: US 8,871,014 B2
(45) Date of Patent: Oct. 28, 2014

(54) PHASE CHANGE INK COMPOSITIONS AND CONDUCTIVE PATTERNS FORMED THEREFROM

(71) Applicant: LG Chem, Ltd., Seoul (KR)

(72) Inventor: Joon-Hyung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 11 days.

(21) Appl. No.: 13/966,986

(22) Filed: Aug. 14, 2013

(65) Prior Publication Data
US 2013/0337240 A1 Dec. 19, 2013

Related U.S. Application Data

(63) Continuation of application No. PCT/KR2013/004512, filed on May 23, 2013.

(30) Foreign Application Priority Data

May 23, 2012 (KR) .......... 10-2012-0054714
May 22, 2013 (KR) .......... 10-2013-0057783

(51) Int. Cl.
| C09D 11/02 | (2014.01) |
| C09D 11/52 | (2014.01) |
| C09D 11/34 | (2014.01) |
| H01B 1/02 | (2006.01) |
| H01B 1/22 | (2006.01) |

(52) U.S. Cl.
CPC ............... C09D 11/52 (2013.01); C09D 11/34 (2013.01); H01B 1/02 (2013.01); H01B 1/22 (2013.01)
USPC ................... 106/31.61; 106/31.87; 106/31.92

(58) Field of Classification Search
CPC ........................................ C09D 11/34
USPC ................... 106/31.61, 31.87, 31.92
See application file for complete search history.

(56) References Cited

U.S. PATENT DOCUMENTS

| 6,015,847 | A | 1/2000 | Titterington et al. |
| 8,409,341 | B2 * | 4/2013 | Iftime et al. ................ 106/31.6 |
| 2004/0072923 | A1 | 4/2004 | Matsunami et al. |
| 2008/0241414 | A1 | 10/2008 | Kim et al. |
| 2009/0321676 | A1 * | 12/2009 | Breton et al. ............ 252/62.53 |
| 2010/0124611 | A1 | 5/2010 | Mayo et al. |
| 2011/0180764 | A1 | 7/2011 | Takahashi et al. |
| 2012/0104330 | A1 | 5/2012 | Choi et al. |
| 2013/0284054 | A1 * | 10/2013 | Iftime et al. ............... 106/31.27 |
| 2013/0284062 | A1 * | 10/2013 | Morimitsu et al. ........ 106/31.61 |

FOREIGN PATENT DOCUMENTS

| KR | 10-2008-0088712 | 10/2008 |
| KR | 10-2010-0055339 | 5/2010 |
| KR | 10-2010-0127785 | 12/2010 |
| KR | 10-2012-0046457 | 5/2012 |

OTHER PUBLICATIONS

Dongjo Kim, et al., Synthesis of silver nanoparticles using the polyol process and the influence of precursor injection, Nanotechnology 17(2006) 4019-4024.

* cited by examiner

*Primary Examiner* — Veronica F Faison
(74) *Attorney, Agent, or Firm* — McKenna, Long & Aldridge LLP

(57) ABSTRACT

A phase change ink composition includes metal nanoparticles, a dispersing agent allowing the metal nanoparticles to be stably dispersed and arranged within the phase change ink composition, and a solvent in which the metal nanoparticles and the dispersing agent are mixed and which comprises at least two sulfur-containing compounds, wherein the phase change ink composition has a melting temperature ranging from 60° C. to 90° C.

9 Claims, No Drawings

PHASE CHANGE INK COMPOSITIONS AND CONDUCTIVE PATTERNS FORMED THEREFROM

CROSS-REFERENCE TO RELATED APPLICATIONS

This application is a Continuation Bypass Application of International Patent Application No. PCT/KR2013/004512, filed May 23, 2013, which claims the priorities of Korean Patent Application Nos. 10-2012-0054714, filed on May 23, 2012, and 10-2013-0057783, filed on May 22, 2013, in the Korean Intellectual Property Office the disclosures of which are incorporated herein by reference.

BACKGROUND OF THE INVENTION

1. Field of the Invention

The present invention relates to a phase change ink composition and a conductive pattern formed using the same, and more particularly, to a phase change ink composition that has a low melting temperature ranging from 60° C. to 90° C., thus enabling the use of a typical inkjet head, and a conductive pattern formed using the same.

2. Description of the Related Art

Optical patterning using a lithography process has been widely used as a general process for forming a conductive pattern. Optical patterning, however, has complicated process steps incurring relatively high costs, and may harmful gas and waste water formed during exposure and etching processes thereof may be discharged, leading to environmental pollution. Therefore, low cost, environmentally-friendly pattern forming methods have been studied, and among such methods, a representative example is an inkjet printing method.

Since the inkjet printing method is a method of directly transferring a desired pattern to a substrate, it has simple process steps, facilitates large-scale printing, reduces processing time, and saves manufacturing costs. Also, since the inkjet printing method does not require an exposure process and an etching process, unlike an existing optical patterning method, it is an environmentally-friendly patterning method that does not discharge environmental pollutants.

To form a conductive pattern using the inkjet printing method, a conductive ink with a low viscosity able to form a conductive line is needed, and for this purpose, conductive metal nanoparticles are used as a material for an ink composition.

However, in the case in which the metal nanoparticles are used as a material for an ink composition, the specific gravity of a metal is higher than an organic solvent, so that the metal nanoparticles may be precipitated to thus deteriorate the storage stability.

Decreasing the size of the metal nanoparticles is effective in decreasing the settling speed thereof by Brownian motion, but is not a fundamental solution. Also, there exists a method of continuously using a stirrer so as to prevent metal nanoparticles from settling, but since the method requires the continuous operation of the stirrer, a cost increase may be incurred.

An increase in the viscosity of ink may reduce the settling speed of the metal nanoparticles, and further by solidifying the ink, the settling of the metal nanoparticles may be stopped completely. Therefore, studies into an ink composition having a solid state at room temperature but a liquid state in a temperature rise range allowed by an inkjet device, and able to maintain a viscosity of not more than 20 cP at a jetting temperature have been undertaken.

Thus, an ink composition containing a phase change ink of a wax component as a main component has been developed, and the ink composition has a melting temperature exceeding 90° C. To meet the melting temperature of the ink composition, the inkjet head should be maintained at a temperature not lower than 100° C. in consideration of a temperature allowance of the inkjet head; however, such a temperature is higher than 90° C., the temperature allowance of most inkjet heads. Therefore, the phase change ink should only be used for a specially designed inkjet head. Also, the wax component, a main component of the ink composition is mostly nonpolar, insoluble in water, and is only soluble in a nonpolar solvent. Therefore, in the case in which a polar additive used in a general ink is added to the ink composition, the polar additive may not be well mixed, so that a phase separation may be caused.

SUMMARY OF THE INVENTION

An aspect of the present invention is to provide a phase change ink composition enabling the use of atypical inkjet head unusable with an existing phase change ink and an additive having a polar molecular structure, and a conductive pattern formed using the same.

According to an aspect of the present invention, there is provided a phase change ink composition including: metal nanoparticles; a dispersing agent; and a solvent which comprises at least two sulfur-containing compounds, wherein the phase change ink composition has a melting temperature ranging from 60° C. to 90° C.

The phase change ink composition may include 20 parts by weight to 70 parts by weight of the metal nanoparticles, 1 part by weight to 10 parts by weight of the dispersing agent, and 20 parts by weight to 79 parts by weight of the solvent.

The surfaces of metal nanoparticles may be capped with the dispersing agent.

The sulfur-containing compounds may be sulfone group-containing compounds.

The solvent may be a mixture of a first solvent having a melting point ranging from 80° C. to 200° C. and a second solvent having a melting point ranging from 0 to 40° C.

The first solvent may be dimethyl sulfone and the second solvent may be sulfolane, and it is preferable that the mixing ratio of the first solvent to the second solvent is 1:0.75 to 1:1.5.

The metal nanoparticles may comprise at least one selected from the group consisting of gold (Au), silver (Ag), copper (Cu), nickel (Ni), zinc (Zn), platinum (Pt), tin (Sn), chromium (Cr), palladium (Pd), cobalt (Co), titanium (Ti), molybdenum (Mo), iron (Fe), manganese (Mn), tungsten (W) and aluminum (Al).

The phase change ink composition may have a viscosity ranging from 1 cp to 20 cp within a melting temperature ranging from 60° C. to 90° C.

According to another aspect of the present invention, there is provided a conductive pattern formed by using the above-mentioned phase change ink composition.

In addition, the means for solving the problem does not list all features of the present invention. Further features, advantages and effects of the present invention will become apparent from the following description of exemplary embodiments.

DETAILED DESCRIPTION OF THE PREFERRED EMBODIMENT

Hereinafter, embodiments of the present invention will be described in detail. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

A phase change ink composition of the present invention is characterized by including: 1), metal nanoparticles; 2), a dispersing agent allowing the metal nanoparticles to be stably dispersed and arranged within the phase change ink composition; and 3), a solvent in which the metal nanoparticles and the dispersing agent are mixed and which comprises at least two sulfur-containing compounds, wherein the phase change ink composition has a melting temperature ranging from 60° C. to 90° C.

Also, the melting temperature of the phase change ink composition may be in a range of 65° C. to 75° C., or 65° C. to 70° C.

Meanwhile, the phase change ink composition in specification of the present invention is in a solid state which has no fluidity in substance within a temperature range of 20° C. to 27° C., for example, room temperature. However, if the ink composition is heated, it changes a state from solid to liquid in a temperature range of 60° C. to 90° C. Specially, it exists as a liquid state in a jetting temperature.

More specifically, it is preferable that the ink composition of the present invention includes 1), 20 parts by weight to 70 parts by weight of the metal nanoparticles, 2), 1 part by weight to 10 parts by weight of the dispersing agent, and 3), 20 parts by weight to 79 parts by weight of the solvent.

Meanwhile, the solvent may be a polar solvent. Since a phase change ink used in a related art uses a nonpolar wax as a main component, a nonpolar solvent is used as the solvent. The use of the nonpolar solvent may not allow a polar additive to be used. Meanwhile, the present invention may use a polar additive, which is used in an ordinary ink composition, by using a polar solvent as the solvent.

For example, the sulfur-containing compounds may be sulfone group-containing compounds. In other words, the ink composition of the present invention may be what includes 1), metal nanoparticles; 2), a dispersing agent allowing the metal nanoparticles to be stably dispersed and arranged within the phase change ink composition; and 3), a solvent in which the metal nanoparticles and the dispersing agent are mixed and which comprises at least two of sulfone group-containing compounds, wherein the phase change ink composition has a melting temperature ranging from 60° C. to 90° C.

Also, the solvent may comprise a first solvent having a melting point ranging from 80° C. to 200° C. and a second solvent having a melting point ranging from 0 to 40° C. In detail, the solvent may be a mixture of a first solvent having a melting point ranging from 80° C. to 200° C. and a second solvent having a melting point ranging from 0 to 40° C.

The first solvent may be methylphenyl sulfone (having a melting point of 85° C.), diphenyl sulfone (having a melting point of 123° C.), dimethyl sulfone (having a melting point of 109° C.), 4,4'-dichlorodiphenyl sulfone (having a melting point of 143° C.), di-p-tolyl sulfone (having a melting point of 160° C.), or 4-aminophenyl sulfone (having a melting point of 175° C.), but not limited thereto. In addition, the second solvent may be sulfolane (having a melting point of 27.5° C.).

In detail, the first solvent may be dimethyl sulfone and the second solvent may be sulfolane. In more detail, the solvent may be a mixture of dimethyl sulfone and sulfolane. Dimethyl sulfone is a polar solvent, a solid at room temperature, and sulfur atoms and oxygen atoms contained in the dimethyl sulfone exhibit a strong polarity. Therefore, in the case in which dimethyl sulfone is used as the solvent, it is possible to prepare an ink containing a polar additive. Also, since the melting point of dimethyl sulfone is 109° C., dimethyl sulfone may maintain a solid state at room temperature; however, the melting point of dimethyl sulfone is higher than 90° C., a maximum point of a temperature allowance range of a general inkjet head. Therefore, the present invention allows the melting temperature of the phase change ink composition to be controllable by mixing sulfolane, a polar solvent which has a good compatibility with dimethyl sulfone, and a low melting point.

At this time, it is preferable that the mixing ratio of the first solvent to the second solvent be within a range of 1:0.75 to 1:1.5, for example, the mixing ratio of dimethyl sulfone and sulfolane may be in a range of 1:0.75 to 1:1.5. The melting temperature may be controlled to be a low temperature by increasing the content of the second solvent. However, it is noted that if the second solvent is mixed in an amount of less than an amount that is 0.75 times greater than the amount of the first solvent, the melting temperature of the prepared phase change ink composition becomes higher than 90° C., making it difficult to use a typical inkjet head, and if the second solvent is mixed in an amount of more than an amount that is 1.5 times greater than the amount of the first solvent, the melting temperature of the phase change ink composition becomes lower than 60° C., so that a phenomenon in which, after the ink is jetted the jetted ink does not solidify fast enough and is spread, may occur.

Therefore, the melting temperature of the phase change ink composition may be controlled depending on the type of the inkjet head used. For example, in the case of using a DMC-11610/DMC-11601 inkjet head by Dimatix Inc., the melting temperature may be controlled to at most 70° C., and in the case of using a Dimatix Nova inkjet head, the melting temperature may be controlled to at most 90° C. The maximum temperature usable in inkjet heads of other companies or models is specified by manufactures, and is generally in a range of 60° C. to 90° C.

Also, it is preferable that the phase change ink composition of the present invention has a viscosity ranging from 1 cp to 20 cp in the above-mentioned melting temperature range. In terms of stable jetting of ink and smooth operation of an inkjet apparatus, it is preferable that the viscosity of the phase change ink composition in use temperature is within the above-mentioned range.

Meanwhile, the solvent may be provided in an amount of 20 parts by weight to 79 parts by weight based on 100 parts by weight of the phase change ink composition. The solvent may be preferably provided in an amount of 20 parts by weight to 70 parts by weight or 50 parts by weight to 79 parts by weight, more preferably in an amount of 60 parts by weight to 75 parts by weight. At this time, if the amount of the solvent is less than 20 parts by weight, the proportion of the metal nanoparticles in the phase change ink composition is so high that the phase change ink composition does not exhibit a viscosity suitable for jetting at a temperature of not less than the melting temperature, and if the amount of the solvent is more than 79 parts by weight, the proportion of the metal nanoparticles in the phase change ink composition is so low that the conductivity of a formed pattern is lowered.

Next, an average diameter of the metal nanoparticles 1) may in a range of 2 nm to 500 nm.

The metal nanoparticles may comprise, for example, at least one selected from the group consisting of gold (Au), silver (Ag), copper (Cu), nickel (Ni), zinc (Zn), platinum (Pt), tin (Sn), chromium (Cr), palladium (Pd), cobalt (Co), titanium (Ti), molybdenum (Mo), iron (Fe), manganese (Mn), tungsten (W) and aluminum (Al). The metal nanoparticles may be a pure metal itself of gold (Au), silver (Ag), copper (Cu), nickel (Ni), zinc (Zn), platinum (Pt), tin (Sn), chromium (Cr), palladium (Pd), cobalt (Co), titanium (Ti), molybdenum (Mo), iron (Fe), manganese (Mn), tungsten (W) or aluminum (Al), or an alloy thereof, but not limited thereto.

The metal nanoparticles may be provided in an amount of 20 parts by weight to 70 parts by weight based on 100 parts by weight of the phase change ink composition. The metal nanoparticles may be preferably provided in an amount of 20 parts by weight to 50 parts by weight or 40 parts by weight to 70 parts by weight, more preferably in an amount of 25 parts by weight to 35 parts by weight. At this time, if the amount of the metal nanoparticles is less than 20 parts by weight, the electrical conductivity of ink is not sufficient, and if the amount of the metal nanoparticles is more than 70 parts by weight, it becomes difficult to disperse the metal nanoparticles.

Meanwhile, a polymer capping layer may be introduced to surfaces of the metal nanoparticles so as to maintain dispersibility in the solvent and then the metal nanoparticles having the introduced polymer capping layer may be dispersed in the solvent. For example, silver nanoparticles, capped with a polymer may be prepared by a polyol synthesizing method, disclosed in prior art documents such as Dongjo Kim et al., Nanotechnology 17: 4019-4024.

Meanwhile, the phase change ink composition comprises the dispersing agent 2) so as to allow the metal nanoparticles to be stably dispersed and arranged in a solvent. The dispersing agent may be at least one selected from the group consisting of polyvinylpyrrolidone, a dispersing agent, for example, disperBYK, disperBYK-101, 102, 103, 106, 107, 108, 109, 110, 111, 112, 115, 116, 130, 140, 142, 145, 160, 161, 162, 163, 164, 166, 167, 168, 169, 170, 171, 174, 180, 181, 182, 183, 184, 185, 187, 190, 191, 192, 193, 194, 198, 199, 2000, 2001, 2008, 2009, 2010, 2012, 2015, 2020, 2022, 2025, 2050, 2059, 2070, 2090, 2095, 2096, 2117, 2118, 2150, 2151, 2155, 2163, 2164, BYKJET-9130, 9131, 9132, 9133, 9150, 9170 commercially available from BYK Inc., Tego Dispers 741 W, 750 W, 755 W, 650, 652, 653, 656, 670, 685 commercially available from Evonic Inc., Solsperse 11200, 12000, 13240, 13300, 13500, 13650, 13940, 16000, 17000, 17940, 18000, 19000, 19200, 20000, 21000, 22000, 24000, 26000, 27000, 28000, 30000, 32000, 32500, 32600, 34750, 35000, 35100, 35200, 36000, 36600, 37500, 38500, 39000, 40000, 41000, 41090, 43000, 44000, 46000, 47000, 50000, 53095, 54000, 71000, 76500, 8000, 8100, 8200, 9000, RM50, X300 commercially available from Lubrizol Inc., and products prepared by other companies. As the dispersing agent, polyvinylpyrrolidone is preferable. However, the above-mentioned other commercially available dispersing agents or unmentioned dispersing agents or wetting agents may exhibit a similar effect to polyvinylpyrrolidone, and thus, the present invention does not limit the type of the dispersing agent.

In the present invention, the surfaces of the metal nanoparticles may be capped with the dispersing agent. By the capping the metal nanoparticles, crystal growth of the metal nanoparticles may be controlled. For example, by the dispersing agent surrounding a specific crystal face of the metal nanoparticles as a capping molecule, effects which prevent cohesion between particles may be achieved, while controlling a growth direction of the nanoparticles. For example, the surfaces of the metal nanoparticles may be capped with polyvinylpyrrolidone, and then, the polyvinylpyrrolidone may role as a dispersing agent at the same time as being used as a capping molecule of a polyol synthesizing method.

The dispersing agent 2) is preferably included in an amount of 1 part by weight to 10 parts by weight, more preferably in an amount of 1 part by weight to 7 parts by weight or 3 parts by weight to 10 parts by weight, most preferably in an amount of 2 parts by weight to 5 parts by weight. At this time, if the amount of the dispersing agent is less than 1 part by weight, the metal nanoparticles may not be properly dispersed, and if the amount of the dispersing agent is more than 10 parts by weight, the viscosity of ink is so high that that it may be difficult to jet the ink composition into the inkjet.

Also, the present invention provides a conductive pattern formed using the phase change ink composition. The conductive pattern is formed by heating and melting a solid phase change ink composition, jetting the molten liquid phase change ink composition onto a substrate, and heating the jetted ink composition. Meanwhile, the ink composition may melt to flow when heated. But, the metal nanoparticles are not influenced much by melting of the ink composition due to a pinning phenomenon in which the metal nanoparticles stick instantly if it reaches surfaces of a substrate, it is possible to form a fine pattern presenting excellent conductivity using the phase change ink composition.

At this time, since the jetted ink composition has very small sized droplets of not more than 100 pl, the droplets solidify immediately after dropping onto a substrate material, so that a spreading phenomenon of the droplets is suppressed, advantageous in forming a fine conductive pattern. Also, a typical phase change ink has a droplet shape in a state such that a surface energy of the substrate material and a surface tension of ink arrive at an equilibrium state, whereas the phase change ink composition of the present invention solidifies to fix the shape thereof before the arrival of such an equilibrium state and thus, the shape of the ink composition is not greatly influenced by the surface energy of the substrate material. Therefore, the phase change ink composition of the present invention provides an excellent effect in which a precise surface energy treatment for the substrate material may be omitted.

Meanwhile, since a conductive pattern formed of a related art ink composition has a line width greatly varied with the surface energy of a substrate material and may be even spread to a line width that is four times greater than an effective diameter of an inkjet nozzle, it is disadvantageous in materializing fine conductive patterns, whereas the conductive pattern formed of the phase change ink composition of the present invention has fine conductive patterns formed with a comparatively constant width that is 1.5 to 2 times greater than an effective diameter of an inkjet nozzle.

Meanwhile, the present invention provides a method preparing a phase change ink composition including metal nanoparticles, a dispersing agent and a solvent which comprises at least two sulfur-containing compounds, wherein the phase change ink composition has a melting temperature ranging from 60° C. to 90° C.

The phase change ink composition, for example, may be prepared by a method mixing metal nanoparticles, a dispersing agent and a solvent which comprises at least two sulfur-containing compounds, at this time, the solvent which comprises at least two sulfur-containing compounds may be a mixture of a first solvent and a second solvent.

Meanwhile, in the present invention, metal nanoparticles, a dispersing agent and a solvent which comprises at least two sulfur-containing compounds, may be mixed at once, or, after preparing a metal nanoparticles dispersion by mixing metal nanoparticles and a dispersing agent with an organic solvent, a solvent which comprises at least two sulfur-containing compounds may be mixed with the dispersion. In more detail, the phase change ink composition of the present invention may be prepared by mixing a solvent which comprises at least two sulfur-containing compounds, that is, a first solvent and a second solvent, after mixing metal nanoparticles and a dispersing agent in an organic solvent, firstly, and then capping the surfaces of the metal nanoparticles with the dispersing agent using a polyol synthesizing method, secondly.

At this time, because the organic solvent used in preparing a dispersion or in capping step has to be removed after mixing a first solvent, using a solvent which has boiling point lower than that of a first solvent is preferable. At this time, removal of the organic solvent may be performed by evaporation or performing a centrifugal process, etc.

In detail, the present invention provides a method of preparing of the phase change ink composition comprising preparing a composition by mixing metal nanoparticles, a dispersing agent, a first solvent and a solvent which has boiling point lower than that of the first solvent; evaporating the solvent which has boiling point lower than that of the first solvent; and mixing a second solvent with the composition from which the solvent having boiling point lower than that of the first solvent has been evaporated.

Also, the present invention provides a method of preparing of the phase change ink composition comprising preparing a composition by mixing metal nanoparticles, a dispersing agent, and a solvent which has boiling point lower than that of a first solvent; obtaining metal nanoparticles and a dispersing agent removing the solvent which has boiling point lower than that of a first solvent by performing a centrifugal process; and preparing a composition by mixing the metal nanoparticles and the dispersing agent obtained by performing a centrifugal process with a first solvent and a second solvent.

Embodiment

Hereinafter, to help in the understanding of the present invention, preferred examples will be provided. The embodiments, however, are provided for more easily understanding the present invention, and should not be construed as limiting the scope of the present invention described herein.

1. Preparation of Ink Composition

Preparation Example 1-E1

50 g of ethylene glycol (having a boiling point of 197° C.) solution containing 50 wt % of silver nanoparticles capped with polyvinylpyrrolidone which was synthesized using a polyol synthesizing method was mixed with 25 g of dimethyl sulfone to prepare a mixture, the prepared mixture was put in a flask through which nitrogen flowed, and was heated to 200° C. while being stirred using a magnetic bar. At that time, dimethyl sulfone was melted and uniformly mixed with the silver nanoparticles-containing solution. As the heating continued, ethylene glycol, the solvent which was originally contained in the silver nanoparticles-containing solution and had a low boiling point was evaporated. The heating continued for 1 hour to obtain a composition containing about 25 g of silver nanoparticles, and about 25 g of dimethyl sulfone and other materials. 100 parts by weight of the prepared ink composition consisted of 45 parts by weight of silver nanoparticles adsorbed with polyvinylpyrrolidone, 3 parts by weight of polyvinylpyrrolidone, and 52 parts by weight of dimethyl sulfone. This composition solidified at around 100° C. and had a solid state at room temperature.

Preparation Example 2-E2

25 g of a silver paste was obtained by performing a centrifugal process on a dispersion including silver nanoparticles capped with polyvinylpyrrolidone which was synthesized using a polyol synthesizing method. The silver paste was mixed with 55 g of sulfolane to prepare a mixture, the prepared mixture was put in a flask through which nitrogen flowed, and was heated to 150° C. while being stirred using a magnetic bar. 100 parts by weight of the prepared ink composition consisted of 32 parts by weight of silver nanoparticles, 2 parts by weight of polyvinylpyrrolidone, and parts by weight of sulfolane. This ink composition solidified around 25° C. and had a liquid state or a semi-solid state at room temperature.

Preparation Example 3-E3

25 g of a silver paste was obtained by performing a centrifugal process on a dispersion including silver nanoparticles capped with polyvinylpyrrolidone which was synthesized using a polyol synthesizing method. The silver paste was mixed with 55 g of methylphenyl sulfone to prepare a mixture, the prepared mixture was put in a flask through which nitrogen flowed, and was heated to 150° C. while being stirred using a magnetic bar. The prepared mixture could not be used as an ink due to dispersibility characteristics of the silver nanoparticles being unfavorable.

Preparation Example 4-E4

50 g of a silver paste was obtained by performing a centrifugal process on a dispersion including silver nanoparticles capped with polyvinylpyrrolidone which was synthesized using a polyol synthesizing method. 50 g of a solution containing butylcarbitol as a main solvent component was added to the silver paste to prepare an ink composition. 100 parts by weight of the prepared ink composition consisted of about 45 parts by weight of silver nanoparticles, 3 parts by weight of polyvinylpyrrolidone, and 52 parts by weight of butylcarbitol. This composition was in a liquid state at room temperature.

Preparation Example 5-E5

Silver nanoparticles capped with polyvinylpyrrolidone were obtained by performing a centrifugal process on a dispersion including silver nanoparticles capped with polyvinylpyrrolidone which was synthesized using a polyol synthesizing method. A paraffin solution was added to 50 g of a solution containing butylcarbitol as a main solvent component and 50 wt % of the silver nanoparticles capped with polyvinylpyrrolidone to prepare an ink composition. The prepared ink composition consisted of 25 parts by weight of silver nanoparticles, 2 parts by weight of polyvinylpyrrolidone, 23 parts by weight of butylcarbitol, and 50 parts by weight of paraffin. The paraffin solution was not uniformly mixed with the silver nanoparticles-containing solution, and when the paraffin solution was put in a flask through which nitrogen flowed and was heated to 120° C. while being stirred using a magnetic bar, silver nanoparticles were precipitated as an agglomerate with a portion of the solvent being evaporated. It was proved that the ink composition was not suitable for a use as an ink because the agglomerate clogged an inkjet nozzle.

Preparation Example 6-E6

50 g of ethylene glycol (having a boiling point of 197° C.) solution containing 50 wt % of silver nanoparticles capped with polyvinylpyrrolidone which was synthesized using a polyol synthesizing method, was mixed with 25 g of dimethyl sulfone (a boiling point 238° C.) to prepare a mixture, the prepared mixture was put in a flask through which nitrogen flowed, and was heated to 200° C. while being stirred using a magnetic bar. At that time, dimethyl sulfone was melted and uniformly mixed with the silver nanoparticles-containing solution. As the heating continued, ethylene glycol, the solvent which was originally contained in the silver nanoparticles-containing solution and had a low boiling point was evaporated. The heating continued for 1 hour to obtain a composition containing about 25 g of silver nanoparticles, and about 27 g of dimethyl sulfone and other materials. This composition solidified at around 100° C. and had a solid state at room temperature.

35 g of sulfolane was added to the prepared composition so as to prepare an ink composition having a low melting temperature, and was stirred at 120° C. 100 parts by weight of the prepared ink composition consisted of 28 parts by weight of silver nanoparticles, 2 parts by weight of polyvinylpyrrolidone, 30 parts by weight of dimethyl sulfone, and 40 parts by weight of sulfolane. The melting temperature of the ink composition was about 65° C., and the ink composition had a solid state at room temperature.

Preparation Example 7-E7

25 g of a silver paste was obtained by performing a centrifugal process on a dispersion including silver nanoparticles capped with polyvinylpyrrolidone which was synthesized using a polyol synthesizing method. The silver paste was mixed with 15 g of dimethyl sulfone and 35 g of sulfolane to prepare a mixture, the prepared mixture was put in a flask through which nitrogen flowed, and was heated to 150° C. while being stirred using a magnetic bar. 100 parts by weight of the prepared ink composition consisted of 32 parts by weight of silver nanoparticles, 2 parts by weight of polyvinylpyrrolidone, 28 parts by weight of dimethyl sulfone, and 38 parts by weight of sulfolane. This composition solidified around 65° C. and had a solid state at room temperature.

2. Formation of Pattern

As described below, a pattern was formed on a glass substrate, a silicon substrate, a polyethylene terephthalate (PET) film and inkjet photo paper in an inkjet method by using the prepared ink composition. At that time, a print head of a DMP 2830 (hereinafter referred to as 'an inkjet apparatus 1') by Dimatix Inc. and having a maximum temperature of 70° C., and a print head of a Galaxy 256/30 HM (hereinafter referred to as 'an inkjet apparatus 2') specially made for use in high temperature among 20 products of the same company and having a maximum temperature of 130° C. were used, and effective diameters of the inkjet heads used were all 22 μm.

Comparative Example 1

An ink composition E1 in Preparation Example 1 was unable to be used in the inkjet apparatus 1. However, the ink composition E1 was used to form a pattern by using the inkjet apparatus 2. In a state in which the print head of the inkjet apparatus 2 was maintained at a temperature of 110° C., E1 ink composition was jetted onto a glass substrate at an interval of 50 μm to form a metal line pattern. At that time, the line width of the formed metal line pattern was 82 μm.

Comparative Example 2

An ink composition E2 in Preparation Example 2 was injected into the inkjet head used in the inkjet apparatus 1. While maintaining the head at a temperature of 70° C., the ink composition E2 was jetted onto a glass substrate at an interval of 30 μm to form a metal line pattern. At that time, a phenomenon in which droplets were spread after being dropped on the glass substrate occurred due to lack of rapid solidification, and the line width of the formed metal line was 81 μm.

Comparative Example 3

An ink composition E4 in Preparation Example 4 was injected into the inkjet head used in the inkjet apparatus 1. While the head was maintained at room temperature, the ink composition E4 was jetted onto a glass substrate at an interval of 30 μm to form a metal line pattern. At that time, a phenomenon in which droplets were spread after being dropped on the glass substrate occurred, and the line width of the formed metal line was 85 μm.

Comparative Example 4

An ink composition E4 in Preparation Example 4 was injected into the inkjet head used in the inkjet apparatus 1. While the head was maintained at room temperature, the ink composition E4 was jetted onto inkjet photo paper at an interval of 30 μm to form a metal line pattern. At that time, the photo paper absorbed the solvent to suppress a line spreading phenomenon, and the line width of the formed metal line was 41 μm.

Example 1

An ink composition E6 in Preparation Example 6 was heated to 75° C., changed to a liquid state, and injected into the inkjet head used in the inkjet apparatus 1. While the head was maintained at 70° C., the injected ink composition E6 was jetted onto a glass substrate at an interval of 30 μm to form a metal line pattern. At that time, the line width of the formed metal line pattern was 33 μm.

Example 2

An ink composition E6 in Preparation Example 6 was heated to 75° C., changed to a liquid state, and injected into the inkjet head used in the inkjet apparatus 1. While the head was maintained at 70° C., the injected ink composition E6 was jetted on a silicon substrate at an interval of 30 μm to form a metal line pattern. At that time, the line width of the formed metal line pattern was 45 μm.

Example 3

An ink composition E6 in Preparation Example 6 was heated to 75° C., changed to a liquid state, and injected into the inkjet head used in the inkjet apparatus 1. While the head was maintained at 70° C., the injected ink composition E6 was jetted on an inkjet photo paper at an interval of 30 μm to form a metal line pattern. At that time, the line width of the formed metal line pattern was 32 μm.

Example 4

An ink composition E6 in Preparation Example 6 was heated to 75° C., changed to a liquid state, and injected into the inkjet head used in the inkjet apparatus 1. While the head was maintained at 70° C., the injected ink composition E6 was jetted onto a PET film at an interval of 30 μm to form a metal line pattern. At that time, the line width of the formed metal line pattern was 38 μm.

Example 5

An ink composition E7 in Preparation Example 7 was heated to 75° C., changed to a liquid state, and injected into the inkjet head used in the inkjet apparatus 1. While the head was maintained at 70° C., the injected ink composition E7 was jetted onto a glass substrate at an interval of 30 μm to form a metal line pattern. At that time, the line width of the formed metal line pattern was 34 μm.

Example 6

An ink composition E7 in Preparation Example 7 was heated to 75° C., changed to a liquid state, and injected into the inkjet head used in the inkjet apparatus 1. While the head was maintained at 70° C., the injected ink composition E7 was jetted onto a silicon substrate at an interval of 30 μm to form a metal line pattern. The line width of the formed metal line pattern was 44 μm.

Solvent components, melting temperature of the phase change ink composition, and states of the phase change ink composition at room temperature, according to the Preparation Examples, are arranged in Table 1. Also, the line widths of the pattern formed using the ink composition according to Comparative Examples and Examples are arranged in Table 1. Meanwhile, patterns prepared by Examples 1 to 6 presented about dozens of to hundreds of ohm of resistance value while measured on the basis of about 30 mm length.

TABLE 1

| Article | | Solvent component | Melting temperature (° C.) | State of matter at room temperature | Width of pattern formed using ink composition (μm) |
|---|---|---|---|---|---|
| Preparation Example 1 | Comparative Example 1 | dimethyl sulfone | 100 | solid | 82 |
| Preparation Example 2 | Comparative Example 2 | sulfolane | 25 | liquid or semi-solid | 81 |
| Preparation Example 3 | — | methylphenyl sulfone | — | — | — |
| Preparation Example 4 | Comparative Example 3 | butyl carbitol | — | liquid | 85 |
| | Comparative Example 4 | | | | 41 |
| Preparation Example 5 | — | butyl carbitol, paraffin | — | — | — |
| Preparation Example 6 | Example 1 Example 2 Example 3 Example 4 | dimethyl sulfone, sulfolane | 65 | solid | 33 45 32 38 |
| Preparation Example 7 | Example 5 Example 6 | dimethyl sulfone, sulfolane | 65 | solid | 34 44 |

According to the above experimental data, it could be seen that the melting temperature of the ink composition in Comparative Example 1 was not suitable for the inkjet apparatus 1. It can be seen, with reference to Comparative Example 2, that in the case of an ink composition prepared using only sulfolane which has a melting point in a range of 0 to 40° C., as a solvent, it was not suitable for the ink composition of the present invention because a melting temperature of the ink composition was below 60° C. Also, it could be seen, with reference to Comparative Examples 3 and 4, that in the case of an ink composition prepared using a solvent which does not comprise sulfur-containing compounds at all, a phenomenon in which droplets were spread after being dropped on the glass substrate occurred, and the line width varies according to the type of the substrate material.

Meanwhile, Preparation Example 3 shows that, in the case of an ink composition prepared using only methylphenyl sulfone which has a melting point 85° C., as a solvent, it was not suitable for the ink composition of the present invention because dispersibility of the metal nanoparticles was unfavorable. Also, it could be seen that in Preparation Example 5, in the case in which a polar dispersing agent, such as polyvinylpyrrolidone was used as a dispersing agent of the silver nanoparticles, the silver nanoparticles were precipitated in paraffin, a nonpolar solvent, as an agglomerate, and thus the ink composition E5 in Preparation Example 5 was not suitable for an ink composition.

Also, in the case of the ink compositions E6 and E7, the ink compositions were molten at a temperature suitable for the inkjet apparatus 1 by using a mixed solvent of dimethyl sulfone as a first solvent and sulfolane as a second solvent to control the melting temperature. Further, as known by Examples 1 to 6, fine patterns having a comparatively constant width that was 1.5 to 2 times greater than the effective diameter of the inkjet nozzle could be formed regardless of substrate material.

As set forth above, according to the phase change ink composition of the present invention, since the melting temperature of the ink composition is adjustable within an temperature allowance range of atypical inkjet head and a polar additive is usable, the ink composition is superior in terms of product development or quality control, and since the ink composition maintains a solid state at room temperature, the metal nanoparticles may be prevented from settling, thus increasing storage stability.

While the present invention has been shown and described in connection with the exemplary embodiments, it will be apparent to those skilled in the art that modifications and variations can be made without departing from the spirit and scope of the invention as defined by the appended claims.

What is claimed is:

1. A phase change ink composition comprising:
   conductive metal nanoparticles;
   a dispersing agent; and
   a solvent mixture of a first sulfur-containing solvent having a melting point ranging from 80° C. to 200° C. and a second sulfur-containing solvent having a melting point ranging from 0 to 40° C.,
   wherein the phase change ink composition has a melting temperature ranging from 60° C. to 90° C.

2. The phase change ink composition of claim 1, wherein the phase change ink composition comprises:
   20 parts by weight to 70 parts by weight of the conductive metal nanoparticles;
   1 part by weight to 10 parts by weight of the dispersing agent; and
   20 parts by weight to 79 parts by weight of the solvent mixture.

3. The phase change ink composition of claim 1, wherein the surfaces of the conductive metal nanoparticles are capped with the dispersing agent.

4. The phase change ink composition of claim 1, wherein the first and second sulfur-containing solvents are sulfone group-containing compounds.

5. The phase change ink composition of claim 1, wherein the first sulfur-containing solvent is dimethyl sulfone and the second sulfur-containing solvent is sulfolane.

6. The phase change ink composition of claim 1, wherein the mixing ratio of the first sulfur-containing solvent to the second sulfur-containing solvent is 1:0.75 to 1:1.5.

7. The phase change ink composition of claim 1, wherein the conductive metal nanoparticles comprises at least one selected from the group consisting of gold (Au), silver (Ag), copper (Cu), nickel (Ni), zinc (Zn), platinum (Pt), tin (Sn), chromium (Cr), palladium (Pd), cobalt (Co), titanium (Ti), molybdenum (Mo), iron (Fe), manganese (Mn), tungsten (W) and aluminum (Al).

8. The phase change ink composition of claim 1, wherein the phase change ink composition has a viscosity ranging from 1 cp to 20 cp within a melting temperature ranging from 60° C. to 90° C.

9. A conductive pattern formed using the phase change ink composition of claim 1.

\* \* \* \* \*